Oct. 25, 1966   G. M. BOUTON ETAL   3,281,222
ACTIVATED ROSIN FLUXES AND CORED SOLDERS MADE THEREFROM
Filed June 12, 1963
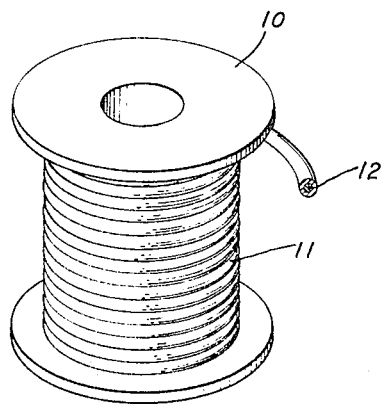
INVENTORS G. M. BOUTON
M. J. O'BRIEN
BY 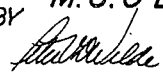
ATTORNEY

United States Patent Office 3,281,222
Patented Oct. 25, 1966

3,281,222
ACTIVATED ROSIN FLUXES AND CORED
SOLDERS MADE THEREFROM
George M. Bouton, Madison, and Maurice J. O'Brien,
Piscataway Township, Middlesex County, N.J., assignors to Bell Telephone Laboratories, Incorporated, New York, N.Y., a corporation of New York
Filed June 12, 1963, Ser. No. 287,379
6 Claims. (Cl. 29—191.6)

This invention relates to flux compositions for use with metal alloy solders and more specifically to activators for increasing the effectiveness of the flux. It further relates to cored solders incorporating the novel activated flux.

Several rosin flux activators have been suggested in the art certain of which are quite appropriate for limited soldering applications. Typically the highly active additives are also corrosive which reduces the long term integrity of the soldered connection especially in corrosive environments. Particular difficulty in this regard is encountered with soldered connections on printed wiring boards. Here in addition to the possibility of connector failure there arises also a problem with dielectric breakdown due to the establishment of current leakage paths formed by metal ion migration encouraged by the corrosive action of the flux activator.

Thus in prescribing an effective all-purpose activated solder flux composition, the desired activating ability of the flux in promoting spreading of the solder for easy application and firm adhesion must be balanced against the long range effect of corrosion on the durability and integrity of the bond (due to the presence of the activator).

The present invention is directed to an activated flux composition which provides exceptional activating properties without the corrosion problems characteristically encountered with highly activated fluxes of the prior art. The novel flux composition is based upon the addition of a brominated hydrocarbon as an activator for rosin fluxes. It has been found that the hydrocarbons must have at least three bromine atoms to be effective for the purpose of this invention. The hydrocarbons within the scope of this invention are alkanes and alkenes having not more than four carbon atoms and benzene.

This additive may effectively be used in combination with any of the known rosin fluxes. The term rosin flux has an accepted meaning in the art but by way of more complete explanation the term rosin refers to a natural rosin which is the gum residue obtained by distillation of the *pinus* species. Typical properties are: specific gravity 1.045 to 1.086, softening point 70° C. to 80° C., melting point 120° C. to 135° C., acid No. 155 to 175 (ester number 8 to 23), saponification number 167 to 194 (methoxyl number, 0), iodine number 80 to 220. The composition of rosin is largely (>75%) resin acids, particularly abeitic acid ($C_{20}H_{30}O_2$). The following is a typical rosin analysis:

Table I

| | Percent |
|---|---|
| Neutrals | 10 |
| Abeitic acids, two double bond | 53 |
| Dihydro acids | 13 |
| Tetrahydro acids (abeitic and pimaric type) | 16 |
| Dehydroabeitic acid | 2 |
| Bicarbonate soluble (oxidized acids) | 6 |

The activated flux of this invention has been found to be effective with any of the known solder types. Specific solder materials which are appropriate are given in the following table:

Table II

60 Sn—40 Pb
45 Sn—55 Pb
40 Sn—60 Pb
50 Pb—32 Sn—18 Cd
57 Bi—43 Sn
95 Pb—2 Sb—3 Sn

Metals which can be joined by soldering methods are well established in the art. These include copper, brass, nickel, iron, zinc and their alloys.

The use of metal solders continues to be important in the electronics industry and is generally employed as cored solder for reasons of convenience and economy. Accordingly, a further embodiment of this invention is a cored solder containing a rosin flux activated with an additive according to this invention.

A more complete understanding of this embodiment may be realized in referring to the drawing in which:

The figure is a perspective view of a spool of cored solder wire containing rosin flux activated with a brominated hydrocarbon.

The figure shows a spool 10 carrying a cored lead-tin solder wire 11. The core is seen at 12 and contains the activated flux described herein. A suitable plasticizer such as turpentine can be added to obtain the desired consistency. Various other plasticizers are well known and are equally useful. Various brominated hydrocarbons were added in prescribed amounts to a standard rosin flux and tested according to the following procedure:

The spread of a fixed volume of solder, at a fixed time and temperature was observed over a horizontal sheet of copper having a surface that was prepared in a reproducible manner. The solder used was solid 60 tin: 40 lead+0.2% antimony. It was 0.062″ diameter by 0.747″ long wound in the form of a flat spiral. The copper sheet was half hard OFHC 0.008″ thick and 1¾″ x 1¼″. While the sheet was held flat, right angle bends were made along two opposite edges to retain flatness and add rigidity. The bent up sides were then trimmed to ⅛″. Prior to forming, the surface to be used for test was thoroughly scrubbed with medium-fine grade 1 steel wool. Heating was accomplished by floating the shaped copper sheet on the surface of a 7-pound melt of 50 lead:50 bismuth alloy maintained at 500° F. This provided rapid and uniform heat transfer and maintained the test piece in a perfectly horizontal position.

Since freshly cleaned copper is readily wet by solder using ordinary rosin flux it does not readily discriminate between various activated rosins. Military specifications on solder spread require copper that has been cleaned and then oxidized for one hour at 400° F. This produces a distinctive chocolate brown oxide coat that can barely be wet by solder at 500° F. when using pure rosin as a flux. It is difficult to prepare samples in quantity in this manner and store them. A coating having a similar appearance and solderability is produced in one minute at 500° F. by floating the cleaned test sheet on the lead bath. This treatment was standardized for testing the activating materials of this invention. It is easy to reproduce since contact of the under surface of the test specimen with the molten lead alloy causes rapid and positive heat transfer and the upper surface is freely exposed to the oxygen of the air. Measurements show that the cuprous oxide produced in one hour at 400° F. according to a military specification is 1750 Angstrom units thick while the one-minute treatment at 500° F. gives a coating 2100 A, in thickness. The additive to be evaluated was added to a rosin saturated alcohol solution (62% rosin).

The testing routine was as follows:
(1) Clean test piece with steel wool.

(2) Bend up sides.
(3) Float test piece on molten bath at 500° F.
(4) Allow to oxidize for 60±2 seconds.
(5) Add solder which was coated by dipping in the flux to be tested.
(6) Record spreading behavior.
(7) After 30 seconds remove test piece from bath.
(8) Allow solder to solidify and record final spread.

The diameters of solder spread in tenths of an inch were obtained by comparison with a series of circles inscribed on a transparent sheet. This test is sufficiently discriminative to adequately show any significant difference between the fluxes.

The results of these tests are shown in Table III. By comparison tests with known commercial activated fluxes a flux which showed a spread of 0.4″ at all concentrations tested was established as exhibiting distinctive qualities and it is this limit which, as applied to the specific results of Table III, defines the degree of halogenation required of the hydrocarbons of this invention.

As the data indicates, the compounds with less than three bromine atoms were not uniformly effective within the 0.4″ limit prescribed. The compounds with three or more bromine atoms showed varying degrees of effectiveness.

Table III

| Example | Additive | Measure of Spreading in Tenths of Inch at Concentration Indicated | | | | |
|---|---|---|---|---|---|---|
| | | 0.1% | 0.25% | 0.5% | 1% | 2% |
| 1 | $CH_2Br_2$ | 3 | 3+ | 3+ | 4 | 4 |
| 2 | $CHBr_3$ | 4 | 4+ | 4 | 4+ | 5 |
| 3 | $CBr_4$ | 5 | 5+ | 6+ | 6+ | 6+ |
| 4 | $CH_3CH_2Br$ | 3 | 4 | 3+ | 3+ | 3 |
| 5 | $CH_2BrCH_2Br$ | 3+ | 3+ | 3+ | 4 | 4 |
| 6 | $CH_2BrCHBr_2$ | 4+ | 5+ | 5+ | 4+ | 5 |
| 7 | $CHBr_2CHBr_2$ | 5 | 5+ | 5+ | 5 | 5 |
| 8 | $CHBr_2CBr_3$ | 4 | 4+ | 5+ | 6+ | 5+ |
| 9 | $CBr_3CBr_3$ | 4 | 4+ | 5 | 5 | 4+ |
| 10 | $C_6H_2Br_4$ | 4 | 4 | 4 | 4 | 5 |
| 11 | $C_6Br_6$ | 4 | 5 | 5+ | 7 | 7 |

The amount of activator needed to achieve the inventive purpose is considered to be defined by the range 0.05% to 3% by weight based upon the rosin weight. Below 0.05% the activity of the rosin is not found to be usefully enhanced. Concentrations above 3% do not give sufficient added effectiveness to justify the added cost. Furthermore, with high activator concentrations the problem of corrosion becomes more acute.

The specific rosin flux used to obtain the data for Table III was Grade WW per ASTM D509. Other rosins having the characteristics previously set forth are equally effective.

The flux compositions of Table III were evaluated as to their corrosive properties according to a well-known test used in commercial standards specifications and generally known as the copper mirror test.

The test is made with the aid of a copper mirror which is a plane sheet of transparent, polished glass having one surface coated with vacuum-deposited copper metal (having a thickness equivalent to 10±5 percent transmission of normally incident light at a wavelength of 5000 Angstroms). At least three drops (approximately 0.05 ml./drop) of the material to be tested are placed on the coated surface and stored in a horizontal position, coated face up, in a clean environment at 75°±3° F. and 50%±5% relative humidity for 24 hours. Complete removal of the copper film as determined by visual examination against a white background and evidenced by the white background showing through constitutes a failure.

All of the flux compositions listed pass this corrosion test.

Flux materials can be applied to the workpiece in various ways. In processing large numbers of elements or where several bonds are to be made in a single unit, as is the case with printed wiring boards, it is often convenient to dip coat the area to be soldered with a freely flowing flux solution. In such cases the flux is diluted with a solvent. For this reason the activated rosins in the investigations reported herein were alcohol solutions of rosin and the prescribed amount of activator. The alcohol quickly evaporates upon standing or with the application of heat to the area to be soldered.

Consequently, the alcohol is appropriately considered as merely an inert carrier. Several solvents can be used for this purpose since rosin is soluble in almost all organic solvents. Obviously, very active or oxidizing solvents should be avoided. With this in mind the reference to activated rosin fluxes should be construed to include such a carrier and also any diluent, filler, antioxidant or other material conventionally included in solder flux compositions.

From the data of Table III it is obvious that other simple brominated hydrocarbons will be effective so long as they possess the requisite degree of bromination. However, no advantage is seen in using aliphatic compounds of greater than four carbon atoms. Accordingly, this invention encompasses activators comprising brominated hydrocarbons of less than five carbon atoms and brominated benzene compounds and having at least three bromine atoms per molecule.

Various other modifications and extensions of this invention will become apparent to those skilled in the art. All such variations and deviations which basically rely on the teachings through which this invention has advanced the art are properly considered within the spirit and scope of this invention.

What is claimed is:
1. An activated solder flux consisting essentially of rosin and 0.05% to 3% by weight of an activator selected from the group consisting of brominated aliphatic compounds of less than five carbon atoms and at least three bromine atoms and brominated benzene compounds having at least three bromine atoms.

2. An activated solder flux consisting essentially of rosin and 0.05% to 3% by weight of carbon tetrabromide.

3. An activated solder flux comprising rosin consisting essentially of 0.05% to 3% by weight of bromoform.

4. A cored solder comprising a tubular tin solder wire, the core of said tubular wire containing a flux consisting essentially of rosin and 0.05% to 3% by weight of an activator selected from the group consisting of brominated aliphatic compounds having less than five carbon atoms and at least three bromine atoms and brominated benzene compounds having at least three bromine atoms.

5. A cored solder comprising a tubular tin solder wire, the core of said tubular wire containing a flux consisting essentially of rosin and 0.05% to 3% by weight carbon tetrabromide.

6. A cored solder comprising a tubular tin solder wire, the core of said tubular wire containing a flux consisting essentially of rosin and 0.05% to 3% by weight of bromoform.

References Cited by the Examiner
UNITED STATES PATENTS

| | | | |
|---|---|---|---|
| 2,715,084 | 8/1955 | Konig | 148—23 |
| 3,075,486 | 1/1963 | Laubmeyer et al. | 148—23 |
| 3,086,893 | 4/1963 | Konig | 148—23 |
| 3,127,290 | 3/1964 | Konig | 148—23 |

DAVID L. RECK, *Primary Examiner.*

R. O. DEAN, *Assistant Examiner.*